Dec. 18, 1928.　　　　　　　　　　　　　　　1,696,066
E. M. WAYLAND
UP-EDGING MEANS FOR FRUIT SIZERS
Filed Nov. 2, 1927
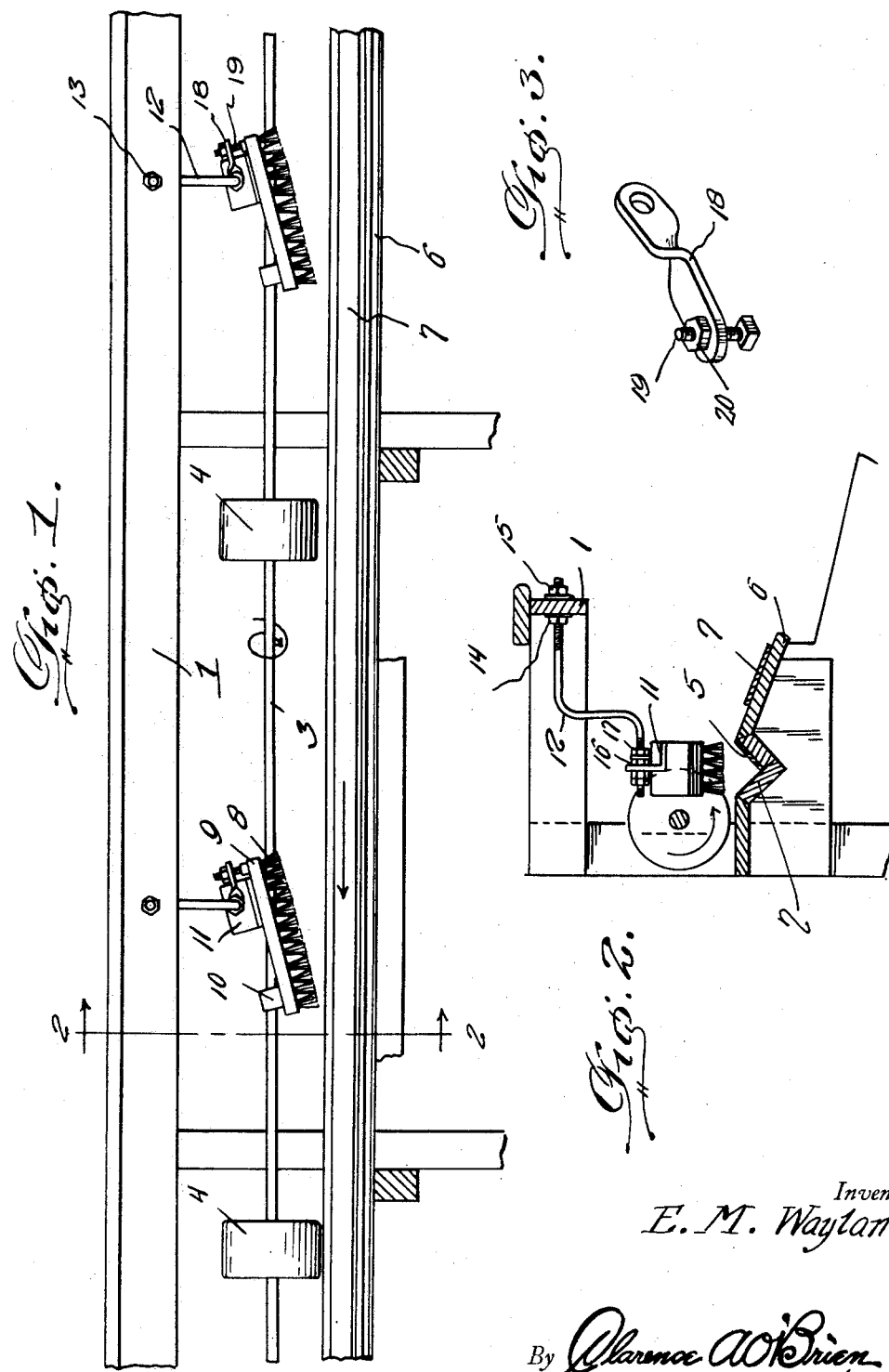
Inventor
E. M. Wayland,
By Clarence A. O'Brien
Attorney Patented Dec. 18, 1928.

1,696,066

UNITED STATES PATENT OFFICE.

EDWIN M. WAYLAND, OF COVESVILLE, VIRGINIA.

UPEDGING MEANS FOR FRUIT SIZERS.

Application filed November 2, 1927. Serial No. 230,555.

The obect of my said invention is to increase the efficiency and accuracy of fruit sizing apparatus by the provision of upedging means for developing friction between fruit elements, as apples, and a sizing belt through the application of pressure or frictional contact to an apple from above so as to bring about spinning of the apple, as distinguished from "flat riding," and to present the apple to the best advantage to the kick off disc or other gaging or ejecting means so as to assure gaging and ejection on the maximum diameter of the apple transverse to the core thereof.

To the attainment of the foregoing, the invention consists in the improvement as hereinafter described and definitely claimed.

In the accompanying drawing forming part of this specification:

Figure 1 is a view in side elevation showing a portion of a fruit sizer, designed more especially for sizing apples, and equipped with the preferred embodiment of my invention.

Figure 2 is a transverse section taken on the plane indicated by the line 2—2 of Figure 1 looking toward the right.

Figure 3 is an enlarged perspective showing one of the stop arms of the said preferred embodiment.

Similar numerals of reference designate corresponding parts in all the views of the drawings.

Among other elements, the apparatus illustrated comprises a longitudinal overhead portion 1, and a longitudinal trough 2, the sides of which latter may be equally inclined, as illustrated, or may be unequally inclined, in the discretion of the manufacturer and without affecting my invention.

Said apparatus also comprises a longitudinal shaft 3 with kick off discs 4 thereon at spaced intervals in the length thereof, but in this connection I would have it distinctly understood that within the purview of my invention any appropriate gaging and ejecting means may be employed without departure from my invention. A sizing belt 5 is employed on one side of the trough 2, and from the said side of the trough 2 extends an inclined deck on which is a distributing belt 7.

The sizing belt 5 and the distributing belt 7 are in practice driven in the direction indicated by the large arrow in Figure 1.

In furtherance of my invention I employ gravitational up-edgers which are arranged, as shown in Figure 1, so as to engage the apples or other fruit elements before the apples or other fruit elements reach the gaging and ejecting means 4.

In the present and preferred embodiment of my invention the up-edgers are in the form of gravitational brushes with bristles 8 and bodies 9, the bodies 9 being provided at their forward ends with weights 10, or being otherwise made comparatively heavy at said ends. Fixed on the bodies 9 of the brushes are angle plates 11, the upstanding portions of which loosely receive supporting rods 12, extending through and connected to the longitudinal portion 1 as designated by 13. Manifestly the height of the upedgers, preferably gravitational brushes, may be adjusted by turning the upper portion of the rods 12 in the transverse holes in the portion 1 and the rods 12 may be adjustably fixed to the portion 1 by nuts 14 and 15 mounted on the threaded portions of the rods 12 and disposed at opposite sides of the portion 1.

It will also be noted that the up-edgers or brushes are free to oscillate on the rods 12, and while I show the up-edgers or brushes as capable of vertical oscillation, I do not desire to be understood as limiting myself to vertical oscillation, inasmuch as the upedgers or brushes in some instances may be made to oscillate off the vertical without materially affecting the efficiency of the upedgers or brushes.

Fixed by nuts 16 and 17 or other suitable means on the rods 12 are stop arms 18 which are provided with threaded apertures to receive the threaded shank of headed screws 19 on which are mounted lock nuts 20. It will be understood that the screws 19 are adjustable with respect to the stop arms 18 and are adapted to be adjustably fixed to said stop arms 18; and by reference to Figure, 1, it will be understood that the heads of the screws 19 are opposed to the rear or heel portions of the brush bodies 9. From this it follows that the forward ends of the brushes cannot gravitate below the point shown in Figure 1, and it also follows that after the forward ends of the brushes are raised and released, the rear ends of the brushes will be stopped on their upward movement by the heads of the screws 19.

As their designation imports, the upedgers or specifically up-edging brushes are designed to engage and frictionally contact with and bear on apples approaching the gaging and the ejecting means 4 so as to give rise to spinning of the apples so that assuredly the gaging and ejection of the apples by the means 4 will be on the maximum diameters of the apples, transverse to the cores thereof.

It is desirable to feed apples from a hopper to the sizing belt 5 at one end of the apparatus, this because it is cheap and gives rise to high capacity. The mode of feeding alluded to is, however, objectionable because the initial velocity of the apples as they reach the sizing belt is too high and results in flat riding of the apples. My up-edging means develops friction between the apples and the sizing belt by the application of pressure to the apples from above, with the result that the apples are caused to spin and consequently will be presented to the gaging and ejecting means in such fashion that gaging and ejection on the maximum diameters of the the apples—i. e., transverse to the cores thereof, will be assured.

It will be appreciated from the foregoing that by serving the purpose ascribed to them, the up-edgers will obviate the necessity of employing costly and cumbersome feed belts for side feed; and it will also be appreciated that the provision of up-edging means in the relation defined will materially enhance the efficiency and accuracy of the sizing apparatus, particularly when apples are sized. I have specifically described the preferred embodiment of my invention in order to impart a full, clear, and exact understanding of my said embodiment in all of its details. I do not desire, however, to be understood as limiting myself to any specific up-edging means or up-edger, my invention being defined by my appended claims within the scope of which modifications may be made without departure from my invention.

Having thus described the invention, what I claim as new and desire to secure by Letters Patent is:—

1. In a fruit sizer, the combination of a trough, spaced gaging and ejecting means, a sizing belt, and means for engaging and bringing about spinning and up-edging apples and other fruit elements travelling on the sizing belt before such elements reach the gaging and ejecting means and insuring gaging and ejection of the apples or other fruit elements on the maximum diameters thereof.

2. In a fruit sizer, the combination of a trough, spaced gaging and ejecting means, a sizing belt, and spaced means for engaging and bringing about spinning and up-edging of apples and other fruit elements travelling on the sizing belt before such elements reach the gaging and ejecting means, insuring gaging and ejection of the apples or other fruit elements on the maximum diameters thereof, there being one of the said means for bringing about spinning and up-edging of fruit elements to each gaging and ejecting means.

3. In a fruit sizer, the combination of a trough, spaced gaging and ejecting means, a sizing belt, and gravitational means for bearing on and frictionally engaging apples and other fruit elements on the sizing belt before such elements reach the gaging and ejecting means.

4. In a fruit sizer, the combination of a trough, spaced gaging and ejecting means, a sizing belt, and gravitational means for bearing on and frictionally engaging apples and other fruit elements on the sizing belt before such elements reach the gaging and ejecting means, there being one of said gravitational means to each gaging and ejecting means.

5. In a fruit sizer, the combination of a trough, spaced gaging and ejecting means, a sizing belt, and gravitational brushes for bearing on and frictionally engaging apples and other fruit elements before such elements reach the gaging and ejecting means.

6. In a fruit sizer, the combination of a trough, spaced gaging and ejecting means, a sizing belt, and gravitational brushes for bearing on and frictionally engaging apples and other fruit elements before such elements reach the gaging and ejecting means, there being one of said brushes to each gaging and ejecting means.

7. In a fruit sizer, the combination of a trough, spaced gaging and ejecting disks, and gravitational brushes for bearing on and frictionally engaging apples and other fruit elements on the sizing belt before such elements reach the gaging and ejecting disks.

8. In a fruit sizer, the combination of a trough, spaced gaging and ejecting disks, and gravational brushes for bearing on and frictionally engaging apples and other fruit elements on the sizing belt before such elements reach the gaging and ejecting disks, there being one of the said gravitational brushes to each gaging and ejecting disk.

9. In a fruit sizer, the combination of a trough, spaced gaging and ejecting means, a sizing belt, and brushes, one to each gaging and ejecting means, for up-edging apples and other fruit elements on the sizing belt and bringing about spinning of apples and other fruit elements on the belt before such elements reach the gaging and ejecting means.

10. In a fruit sizer, the combination of spaced gaging and ejecting means, means for moving apples and other fruit elements below said spaced gaging and ejecting means, and means, one to each gaging and ejecting means, for upedging apples and other fruit elements and bringing about spinning of apples and other fruit elements and assuring gaging and ejection of the apples and other fruit elements on the maximum diameter thereof.

11. In a fruit sizer, the combination of a trough, spaced gaging and ejecting means, a sizing belt, supports above the trough and sizing belts, oscillatory brushes swingably mounted on said supports and having comparatively heavy forward portions, and means for limiting the gravitational movement of the said forward portions of the brushes, there being one of said supports, brushes, and limiting means to each of said gaging and ejecting means.

12. In a fruit sizer, the combination of a trough, spaced gaging and ejecting means, a sizing belt, and oscillatory, gravitational brushes for engaging apples and other fruit elements before said elements reach the gaging and ejecting means.

13. In a fruit sizer, the combination of a trough, spaced gaging and ejecting means, a sizing belt, and oscillatory gravitational up-edgers arranged to bear on and frictionally engage fruit before the fruit reaches the gaging and ejecting means.

14. In a fruit sizer, the combination of a trough, spaced gaging and ejecting means, a sizing belt, and oscillatory gravitational up-edgers arranged to bear on and frictionally engage fruit before the fruit reaches the gaging and ejecting means, there being one of the said up-edgers to each of the gaging and ejecting means.

15. In a fruit sizer, the combination of a trough, spaced engaging and ejecting means, a sizing belt, a longitudinal portion located in a plane above that of the trough and sizing belt, lateral rod supports carried by said upper longitudinal portion, brushes swingably mounted on said rod support and having comparatively heavy forward portions, and stop means carried by the rod support and adapted to limit upward movement of the rear portions of the brushes.

In testimony whereof I affix my signature.

EDWIN M. WAYLAND.